United States Patent [19]
Lätt

[11] Patent Number: 5,987,304
[45] Date of Patent: Nov. 16, 1999

[54] REPEATER WITH VARIABLE BANDWIDTH

[75] Inventor: Mikael Lätt, Hässelby, Sweden

[73] Assignee: Allgon AB, Akersberga, Sweden

[21] Appl. No.: 08/865,940

[22] Filed: May 30, 1997

[30] Foreign Application Priority Data

May 31, 1996 [SE] Sweden .................................. 9602161

[51] Int. Cl.[6] ........................................... H04B 7/15
[52] U.S. Cl. .................................. 455/17; 455/22
[58] Field of Search ................................. 455/16, 17, 20, 455/22, 19, 9, 12.1, 12; 343/6.8 R, 6.5 R

[56] References Cited

U.S. PATENT DOCUMENTS

| | | | |
|---|---|---|---|
| 3,922,674 | 11/1975 | Gingras, Jr. et al. . | |
| 4,160,212 | 7/1979 | Barquist, Jr. et al. | 325/432 |
| 4,228,401 | 10/1980 | Wachs et al. | 455/12 |
| 4,764,979 | 8/1988 | Noguchi et al. | 455/22 |
| 4,783,843 | 11/1988 | Leff et al. | 455/22 |
| 4,972,346 | 11/1990 | Kawano et al. | 455/9 |
| 5,136,267 | 8/1992 | Cabot . | |
| 5,408,681 | 4/1995 | Ressler et al. . | |
| 5,594,939 | 1/1997 | Curello et al. | 455/12.1 |
| 5,768,685 | 6/1998 | Patel et al. | 455/13.3 |
| 5,809,398 | 9/1998 | Moberg et al. | 455/17 |

FOREIGN PATENT DOCUMENTS

WO95/31866  11/1995  WIPO .

*Primary Examiner*—Wellington Chin
*Assistant Examiner*—Pablo N. Tran
*Attorney, Agent, or Firm*—Jacobson, Price, Holman & Stern, PLLC

[57] ABSTRACT

A mobile telephone repeater with a variable bandwidth is disclosed. The repeater comprises an uplink and downlink, each being provided with amplifier chains (6). Each chain comprises at least two band pass filter units (10, 11) coupled in series and having controllable pass bands, which at least partially overlap each other. The center frequency of the filter units are controllable so as to make the bandwidth of the resulting pass band variable. Consequently, the effective bandwidth of the amplifier chain is controllable.

6 Claims, 2 Drawing Sheets

REPEATER WITH VARIABLE BANDWIDTH

BACKGROUND OF THE INVENTION

1. Field of the Invention

The present invention relates to a mobile telephone repeater comprising an uplink for amplifying signals from a mobile telephone to a base station and a downlink for amplifying signals from said base station to said mobile telephone, said two links being provided with a number of parallel amplifier chains, each amplifier chain being designed to pass through a specific frequency band.

2. Description of the Related Art

A repeater for use in cellular telephone systems is a device which amplifies a received RF-signal and retransmits the amplified signal at same carrier frequency. Normally, a repeater is operative in a rather broad spectrum of radio frequencies in the order of 1–2 GHz. Often, a repeater will serve several telephone system operators, each operator being assigned a specific frequency band within the broad range of frequencies handled by the repeater. Alternatively, an operator may have his own repeater and use various parts of the available frequency range for different purposes.

In any case there is a general demand for flexibility in terms of changing the frequency bands, both in terms of centre frequency and bandwidth. Such changes may be a consequence of permits given by the authorities or by technological changes. Also, operators may leave the scene or new ones may be added.

Accordingly, there is a demand for frequency band changes in one or more of the amplifier chains of the repeater.

Of course, such changes may be effected by changing the hardware components of the repeater, such as filters or the like. However, such hardware changes will normally be cumbersome and fairly costly. Furthermore, repeaters may be mounted at remote locations, whereby hardware replacements will be particularly expensive.

SUMMARY OF THE INVENTION

Against this background, the object of the present invention is to facilitate frequency band changes in the repeater without necessitating hardware replacements.

According to the invention, this object is achieved by a repeater, which is characterized in that at least one of the parallel amplifier chains comprises a filter device having a number of band pass filter units coupled in series; at least two of said two band pass filter units have controllable pass bands which at least partly overlap each other; and the centre frequency of these band pass filter units are controllable so as to make the bandwidth of the resulting overlap pass band variable, whereby the effective bandwidth of the amplifier chain is controllable.

The centre frequencies of the band pass filter units may be controlled electronically, e.g. by the use of mixers coupled to a local oscillator. Oscillators can of course be controlled electronically, without changing any hardware components. Such control may be carried out directly on site or by remote control.

BRIEF DESCRIPTION OF THE DRAWINGS

The invention will now be explained further with reference to the appended drawings illustrating a preferred embodiment.

DETAILED DESCRIPTION OF THE PREFERRED EMBODIMENTS

Figure 1:
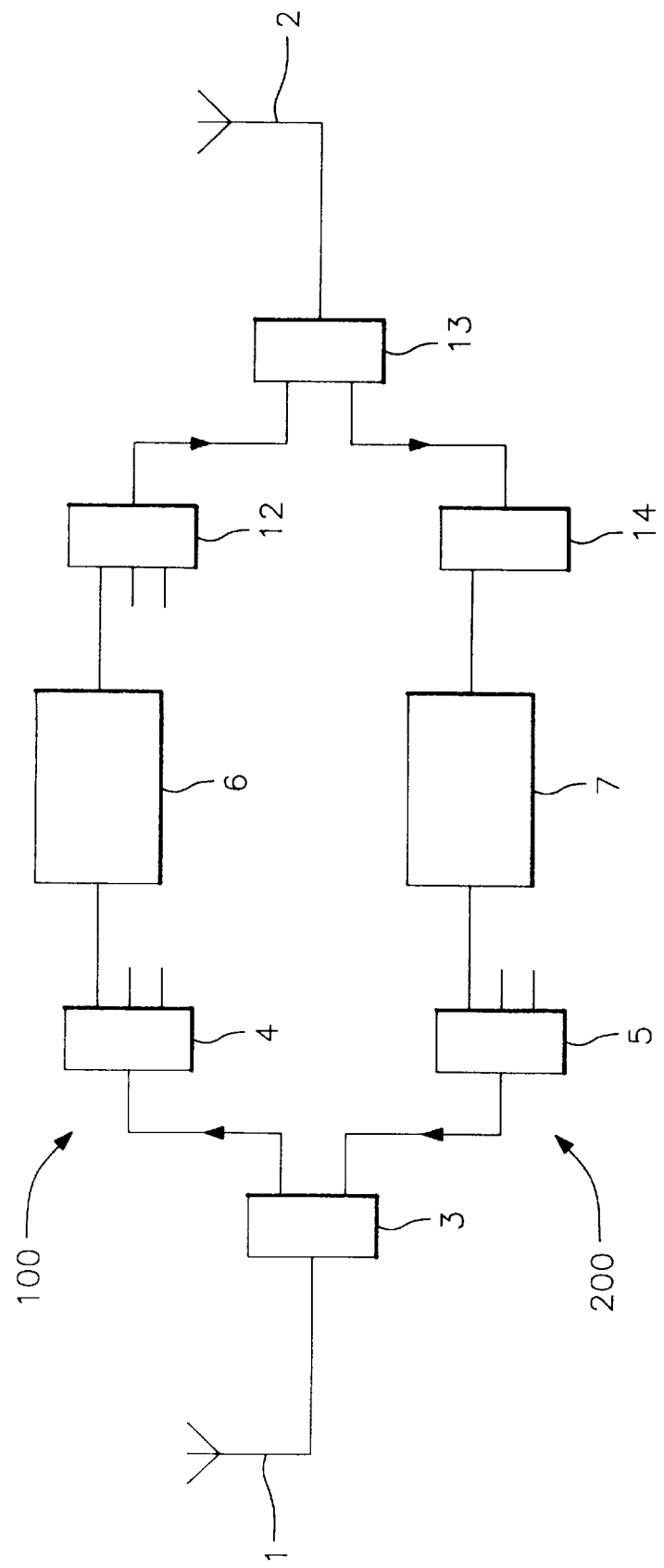
FIG. 1 is a block diagram of a repeater having amplifier chains provided with filter devices according to the invention.

The repeater shown in FIG. 1 is basically of the kind disclosed in the document WO95/31866. It comprises a first antenna 1 for radio communication between the repeater and a cellular mobile telephone (not shown) and a second antenna 2 for a corresponding radio communication between the repeater and a base station (not shown). The RF-signals received by the first antenna 1 are retransmitted, after amplification, by the second antenna 2 at the same (first) carrier frequency. Likewise, the RF-signals received by the second antenna 2 are retransmitted from the first antenna 1 at the same (second) carrier frequency.

The first and second antennas 1, 2 are connected via duplex filters 3, 13 to two oppositely directed links, namely an uplink 100 for transferring signals originating from mobile telephones towards the associated base station, and a downlink 200 for transferring signals in the opposite direction.

In the uplink 100, the signals received by the first antenna 1 are fed through the duplex filter 3 to a multicoupler amplifier 4, which distributes the signals through a number of parallel amplifier chains 6, and further via a combiner 12 and the duplex filter 13 to the second antenna 2. Correspondingly, in the downlink 200, the signals are fed from the second antenna 2 through the duplex filter 13, a multicoupler amplifier 14, a number of parallel amplifier chains 7, a combiner 5, and further via a duplex filter 3 to the first antenna 1.

Each amplifier 6 and 7, respectively, is designed to pass through a specific frequency channel, the centre frequency and bandwidth of which are controllable in accordance with the present invention.

Figure 2:
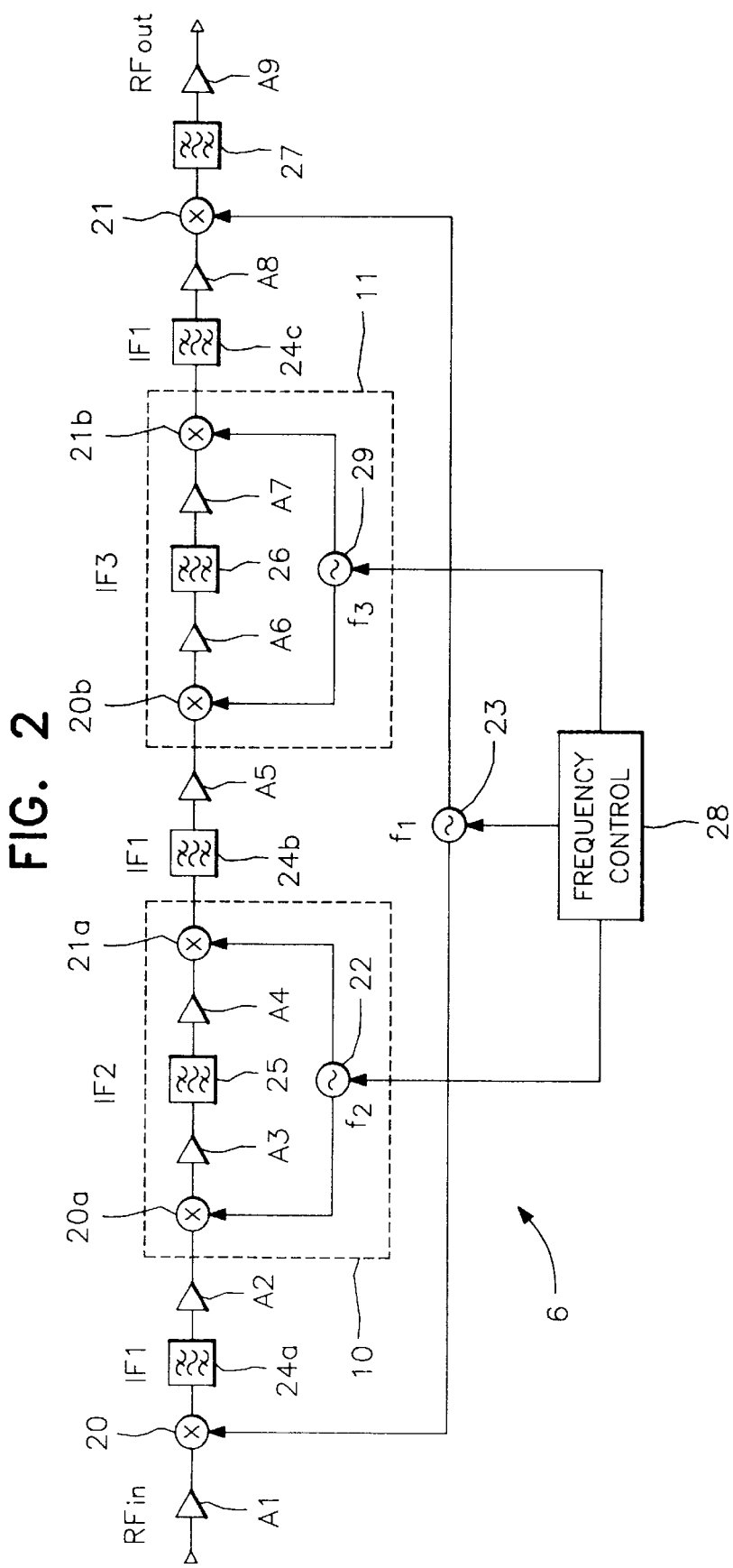
FIG. 2 is a more detailed block diagram of a controllable filter device according to the invention.

A specific example of the amplifier chain 6 is shown in FIG. 2. It should be pointed out that the embodiment of FIG. 2 is illustrated schematically. Thus, FIG. 2 only contains those components which are essential to the present invention, whereas other components, such as possible attenuators, detectors and switching devices for monitoring or adjusting the repeater, e.g. in accordance with the co-pending patent application No. 9600842-0, are left out.

The amplifier chain in FIG. 2 includes a large number of amplifiers A1–A9, a number of down-mixers 20, 20a, 20b, a corresponding number of up-mixers 21a, 21b, 21 and a number of band pass filters 24a, 25, 24b, 26, 24c and 27. At the input and output terminals of the chain, the carrier wave is radio frequent, e.g. in a frequency range around 1800 MHz. At the down-mixer 20, the signal is shifted down to an intermediate frequency IF1 of e.g. 200 MHz. The signal passes through a band pass filter 24a, which is relatively broad, and a subsequent amplifier A2.

Thereafter, the signal passes through a first filter unit 10 defined by a centre frequency IF2 e.g. in the order of 80 MHz and a bandwidth of e.g. 15 MHz. The first band pass filter unit includes a down-mixer 20a, an amplifier A3, a band pass filter 25, an amplifier A4 and an up-mixer 21a, the two mixers 20a, 21a being connected to a VCO (voltage controlled oscillator) 22, the latter being controlled by a frequency control unit 28. Next, the signal, upon being shifted back to the frequency range IF1 200 MHz, passes through a relatively broad band pass filter 24b and the amplifier A5. Next, the signal passes through a second band pass filter unit 11 with a relatively narrow bandwidth. The filter unit 11 includes a down-mixer 20b, an amplifier A6, a band pass filter 26, an amplifier A7, and an up-mixer 21b, the mixers 20b and 21b being connected to a VCO 29, which is likewise controlled by the frequency control unit 28.

Next, the signal passes through a relatively broad filter 24c and the amplifier A8 before it is shifted back to the radio frequency range RF in the up-mixer 21. Finally, the signal is passed through a radio frequency filter 27 and the amplifier A9. The mixers 20 and 21 are connected to a VCO 23, also controlled by the frequency control unit 28.

The band pass filters 25 and 26 of the two filter units 10 and 11 are narrower than the other band pass filters 24a, 24b, 24c and 27. So, the overall bandwidth is primarily dependent on these two filters 25, 26. However, since the oscillators 22 and 29 are controllable, the frequency band entering the respective filter 25, 26 can be shifted upwards or downwards.

Let us assume that, initially, the centre frequencies of the frequency band entering the filters 25, 26 coincide with the centre frequency of each filter 25, 26, so that the frequency band coming out from the filter unit 10 will be passed through the filter unit 11 in its entirety.

Now, if the oscillator 22 is shifted from 280 Hz to a higher frequency, e.g. 282 MHz, and the oscillator 29 is shifted from 280 MHz to a lower frequency, e.g. to 278 MHz, the frequency band entering the fixed filter 25 is shifted and will accordingly be cut off at its upper end and, upon arriving at the filter 26 and having been shifted down, it will be cut off at its lower end, so that the resulting frequency band leaving the filter unit 11 will be reduced by 4 MHz in bandwidth.

It is of course convenient to shift the oscillators 22 and 29 in opposite directions so as to cut off both ends of the frequency band. However, in general, the oscillators do not have to be changed in synchronism in opposite directions. Nor is it strictly necessary to use the same bandwidth of the fixed filters 25 and 26. The crucial feature is that the two fixed filters 25 and 26 have at least partially overlapping pass bands and that the frequency band entering the respective filter can be shifted. In this way, the bandwidth of the resulting overlap pass band is variable, whereby the effective bandwidth of the amplifier chain is controllable.

If desired, the frequency control unit 28 may form a part of a more general control unit serving to control several different functions of the repeater. The control unit may in turn be controlled manually on site or, preferably, electronically by remote control from an operation and monitoring centre.

I claim:

1. A mobile telephone repeater comprising an uplink for amplifying signals from a mobile telephone to a base station and a downlink for amplifying signals from said base station to said mobile telephone, said two links being provided with a number of parallel amplifier chains, each amplifier chain being designed to pass through a specific frequency band, wherein at least one of said parallel amplifier chains comprises a filter device having a number of band pass filter units coupled in series, at least two of said band bass filter units have controllable pass bands which at least partially overlap each other, and the centre frequency of said at least two band pass filter units are controllable so as to make the bandwidth of the resulting overlap pass band variable, whereby the effective bandwidth of the amplifier chain is controllable.

2. The repeater as defined in claim 1, wherein each of said band pass filter units comprises an input mixer, a band pass filter and an output mixer, said input and output mixers being connected to an associated controllable local oscillator, whereby the pass band of each band pass filter unit can be shifted and cut off at one end by changing the output frequency of said local oscillator.

3. A mobile telephone repeater comprising an uplink for amplifying signals from a mobile telephone to a base station and a downlink for amplifying signals from said base station to said mobile telephone, said two links being provided with a number of parallel amplifier chains, each amplifier chain being designed to pass through a specific frequency band, wherein at least one of said parallel amplifier chains comprises a filter device having a number of band pass filter units coupled in series, at least two of said band bass filter units have controllable pass bands which at least partially overlap each other, and the centre frequency of said at least two band pass filter units are controllable so as to make the bandwidth of the resulting overlap pass band variable, whereby the effective bandwidth of the amplifier chain is controllable wherein each of said band pass filter units comprises an input mixer, a band pass filter and an output mixer, said input and output mixers being connected to an associated controllable local oscillator, whereby the pass band of each band pass filter unit can be shifted and cut off at one end by changing the output frequency of said local oscillator, wherein each input mixer is adapted to subtract said local oscillator output frequency from the input signal, whereas each output mixer is adapted to add said local oscillator output frequency to the output signal.

4. A mobile telephone repeater comprising an uplink for amplifying signals from a mobile telephone to a base station and a downlink for amplifying signals from said base station to said mobile telephone, said two links being provided with a number of parallel amplifier chains, each amplifier chain being designed to pass through a specific frequency band, wherein at least one of said parallel amplifier chains comprises a filter device having a number of band pass filter units coupled in series, at least two of said band bass filter units have controllable pass bands which at least partially overlap each other, and the centre frequency of said at least two band pass filter units are controllable so as to make the bandwidth of the resulting overlap pass band variable, whereby the effective bandwidth of the amplifier chain is controllable wherein each of said band pass filter units comprises an input mixer, a band pass filter and an output mixer, said input and output mixers being connected to an associated controllable local oscillator, whereby the pass band of each band pass filter unit can be shifted and cut off at one end by changing the output frequency of said local oscillator, wherein the two controllable local oscillators associated to a respective one of said two band pass filter units are controlled by a common frequency control unit.

5. The repeater as defined in claim 1, wherein the pass bands of said two band pass filter units have the same bandwidth.

6. The repeater as defined in claim 1, wherein the centre frequencies of said two band pass filter units are variable in opposite directions so as to reduce the bandwidth of said resulting overlap pass band when the difference between the centre frequencies is increased and vice versa.

* * * * *